UNITED STATES PATENT OFFICE.

CHARLES F. ECKART, OF OLAA, TERRITORY OF HAWAII.

PROCESS OF INCREASING THE YIELD OF SUGAR-CANE.

1,252,101.  Specification of Letters Patent.  Patented Jan. 1, 1918.

No Drawing.  Application filed May 18, 1916. Serial No. 98,423.

*To all whom it may concern:*

Be it known that I, CHARLES F. ECKART, a citizen of the United States, residing at Olaa, Hawaii, Territory of Hawaii, have invented certain new and useful Improvements in Processes of Increasing the Yield of Sugar-Cane; and I do hereby declare the following to be a full, clear, and exact description of the invention, such as will enable others skilled in the art to which it appertains to make and use the same.

In my co-pending application, Serial No. 97,292, filed May 13, 1916, there is a process disclosed of increasing the yield of sugar-cane by increasing the number and hastening the development of the canes ordinarily known as second-season stalks, or in other words those stalks which make most or all of their growth and development after the first winter of the crop period. As explained in the aforementioned application, in some localities the conditions are such that the entire crop of sugar-cane is matured within one calendar year, while in other localities the conditions are such that the entire crop does not develop within one calendar year but extends into two or three calendar years. In the latter instance, one set of canes is well advanced in growth and development at the end of the first season, and during the second season, that is, after the first winter of the crop period a second set of canes makes its growth from the shoots emanating from the mother cane. At the end of the entire crop period the two sets of canes are simultaneously harvested. The process disclosed in said pending application is intended to increase the number and hasten the development of the canes of the second set which make their growth during the second season, thereby increasing the yield of the entire crop.

The process disclosed in the above application, briefly stated, consists in checking the growth of the first season canes at the beginning or a little before the beginning of the second growing season by cutting off the leafy tops of the cane stalks at a point on each stalk which is well above the uppermost immature joint or node and therefore well above the terminal growing point of the stem. This topping of the cane stalks simultaneously illuminates the entire field by allowing abundance of light to reach the ground in and between the rows of cane and to reach the young second season shoots. At from two to four weeks before the time of checking the growth of the first season canes a fertilizer preferably of a nitrogenous character is applied to the cane rows after the latter have been "cleaned out" or largely freed from weeds and dead cane leaves.

The sudden checking of the growth of the first season canes and the simultaneous illumination of the field causes the springing of young cane shoots from buds lying beneath the surface of the ground, or in other words produces active suckering or tillering of the first season canes and also greatly promotes the growth of the second season shoots. The application of the nitrogenous fertilizer stimulates the growth of the first season canes so that when the growth-checking operation is subsequently performed the check is more pronounced than it would be without the fertilizer treatment, and the number of the second season shoots is correspondingly increased. Furthermore, the growth of the second season shoots is also increased through the action of the fertilizer.

The present process is in the nature of an improvement upon that disclosed in the aforesaid application and briefly described above. It has now been found in practice that the process can be more economically carried out and even better results obtained if the process be carried out as herein disclosed. According to the present improved process all of the cane stalks are not topped. In other words the leafy tops are removed from only a portion of the cane stalks. In the preferred form of the process this is accomplished by removing the leafy tops from the canes of predetermined rows only, such for instance as every other row, every third row, or the canes of two adjacent rows might be topped, the next two rows left untopped and the two rows adjacent to the last mentioned untopped rows topped in the same manner as the first two rows. By topping the cane in this systematic manner or in any other similar systematic manner the removal of the leafy tops of the trimmed or topped rows permits sufficient light to reach the young shoots of the adjacent untopped rows and, of course, permits abundance of light to reach the young shoots in the rows which have been topped. This result follows regardless of whether the cane rows are topped in pairs spaced apart, whether every other row is topped or whether every third row is topped. Furthermore, it may be possible to top the cane stalks in various other systematic manners which would produce this same result of illuminating or admitting sufficient light to all of the young shoots without topping all of the cane stalks.

It is a matter of common observation to practical sugar-cane growers that the outside rows of a cane field are characterized by a heavier and thicker stand of sugar-cane than the interior rows. This is doubtless due principally to the large amount of light which gains access to the outside rows, thereby increasing the tillering of the canes, and at the same time stimulating their individual development. In the present process, the rows adjacent to the "topped rows" are made to resemble, for a considerable period, the outside rows of a field with the result that the tillering of the untopped canes is greatly increased. This extra tillering of the canes in the untopped rows, under some conditions, such as protracted dry and clear weather, for instance, is even greater than occurs in the topped rows.

The result of the topping operation so far as the growth of the shoots in the topped row is concerned is the same as in the application referred to above, that is, the amount of leafy matter left on the cane stalk after the topping operation is naturally relatively small and is considerably out of proportion to the root system of the stalk, thus causing the underground eyes or buds of the cane stalk to sprout and to grow vigorously, the growth being augmented by the additional supply of light resulting from the topping operation. The nitrogenous fertilizer is preferably applied before the topping operation as in the original process, and this fertilizer, together with the abundant supply of light, promotes the growth of the young shoots. The second season shoots in the topped rows are not only assisted in their growth but are greatly increased in number and sturdiness.

The leafy tops which are permitted to remain on the stalks of the rows adjacent to the topped rows afford sufficient shade to protect the young second season shoots. These second season shoots require a certain amount of shade as well as light and sunshine, and it has been found that by topping the cane stalks in a systematic manner as above described the proper amount of light, shade and sunshine can be afforded.

Not only are the new shoots in the topped rows increased in number and sturdiness but the new shoots in those rows which are not topped are also increased in number and sturdiness for the reason that they are supplied with a greater quantity of light, due to the removal of the leafy tops of at least one adjacent row, than would be the case if such adjacent row were not topped. This admission of an extra amount of light into the untopped rows induces extra tillering in these rows, and such conditions are created as to enable a large proportion of the young shoots to grow to maturity, whereas under ordinary conditions most of the young shoots which make their start after the crop is well advanced are soon shaded out by the tops of the older canes. The admission of the additional light to the cane rows likewise acts favorably upon the older canes in the untopped rows and increases their final product.

The systematic manner in which the cane rows are to be topped will depend largely upon the weather conditions. During cloudy or showery periods the topping of every other row is preferable, while during dry weather the topping of every third or even of every fourth or fifth row is preferred. Thus by considering the weather conditions and topping the cane rows accordingly, that amount of light, shade and sunshine may be admitted to the cane rows which will produce the best results.

The topping or cutting operation may be done by a transverse stroke of a knife or other implement through the leafy mass of the cane plants, so that the plants are reduced to practically bare stalks which bear only a fan-like cluster of leaf segments at the top. The topping may be performed high or low, thus increasing or lessening the size of the fan-like cluster of leaf parts so as to afford more or less shade to the young shoots according to the weather conditions. It is to be understood, however, that the cutting is always performed well above the growing point or the growth center of the cane stem.

It will now be seen that according to the foregoing improved form of the process the leafy tops of the stalks are removed from predetermined rows which are systematically spaced so that the increased illumination of all of the cane rows and the intervening spaces is effected. As above stated a fertilizer is applied to the cane rows before the topping operation and preferably after the cane rows have been weeded and the dead cane leaves removed, but if desired the fertilizer may be applied after the topping operation or at any other time at which the best results may be obtained. When the leafy tops are removed from the cane stalks they may be applied as a covering for the spaces between the cane rows as described in the afore-mentioned application in order to check and prevent the growth of weeds in such spaces.

Although the best results have been obtained by topping every second or every third row of cane stalks, I do not wish to limit myself to this procedure, as the cane rows may be topped in various other different ways to produce the results hereinbefore described. The essential feature is that the tops be removed from only certain cane stalks or rows of stalks and that the leafy tops be permitted to remain upon the other stalks, the topped and untopped stalks being so chosen that the growth and development of the young second season shoots in all of the rows are promoted. In this way the process is rendered more economical than if all of the cane stalks were topped, and notwithstanding the fact that a large percentage of the cane stalks remain untopped sufficient light is supplied to all of the new shoots to increase their number and hasten their growth and development, and furthermore the required amount of shade is furnished the new shoots for their proper development.

By thus increasing the number and hastening the growth and development of the second season shoots the total yield of the sugar-cane is, of course, increased, as fully explained in the above-mentioned pending application. The extra amount of light is conducive to the formation of an increased amount of sugar in the second season shoots and the topping of the older canes increases the percentage of sucrose contained in their juice. Thus the increase in the total number of canes in the final stand, and the improvement in the quality of the juice naturally increase the quantity and yield of the sugar obtained from the crop.

What I claim is:—

1. The process of increasing the total yield of sugar from rows of sugar-cane plants, on a unit area which consists in cutting away, above the uppermost immature node or the terminal growing point of the stem, the leafy tops of only those stalks which are in predetermined rows systematically spaced apart for the purpose described.

2. The process of increasing the total yield of sugar from rows of sugar-cane plants on a unit area which consists in temporarily checking the primary apical growth of the stalks in predetermined rows systematically spaced, and simultaneously illuminating such rows and the adjacent rows of unchecked stalks.

3. The process of increasing the total yield of rows of sugar-cane plants on a unit area which consists in promoting the tillering of the plants in predetermined rows by removing, above the uppermost immature node or the terminal growing point of the stem, the leafy tops of the plants in adjacent rows, substantially as described.

4. The process of increasing the total yield of rows of sugar-cane plants on a unit area which consists in removing the leafy tops, above the uppermost immature node or the terminal growing point of the stem, of the plants in certain rows only, for the purpose described.

In testimony whereof I affix my signature.

CHARLES F. ECKART.

Copies of this patent may be obtained for five cents each, by addressing the "Commissioner of Patents, Washington, D. C."